United States Patent
Catalano et al.

(10) Patent No.: US 11,968,272 B1
(45) Date of Patent: Apr. 23, 2024

(54) PENDING UPDATES STATUS QUERIES IN THE EXTENDED LINK SERVICES

(71) Applicant: International Business Machines Corporation, Armonk, NY (US)

(72) Inventors: Pasquale A. Catalano, Wallkill, NY (US); Christopher J Colonna, Ossining, NY (US); Maunik Patel, Tucson, AZ (US); Tara Astigarraga, Fairport, NY (US); Jimmy Pazhoor John, Cary, NC (US); Kieron Dirk Anthony Hinds, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/358,061

(22) Filed: Jul. 25, 2023

(51) Int. Cl.
*H04L 67/00* (2022.01)
*H04L 67/561* (2022.01)

(52) U.S. Cl.
CPC ............ *H04L 67/34* (2013.01); *H04L 67/561* (2022.05)

(58) Field of Classification Search
CPC .............................. H04L 67/34; H04L 67/561
See application file for complete search history.

(56) References Cited

U.S. PATENT DOCUMENTS

| | | | |
|---|---|---|---|
| 10,142,392 B2 | 11/2018 | Raji | |
| 11,070,429 B2 | 7/2021 | Sigoure | |
| 11,368,413 B2 | 6/2022 | Colonna | |
| 11,405,333 B2 | 8/2022 | Colonna | |
| 2020/0220779 A1 | 7/2020 | Sigoure | |
| 2020/0344309 A1 | 10/2020 | Gutt | |

OTHER PUBLICATIONS

"Checking Port Status and Connectivity", CHAPTER 6, Release 12.2(31)SG, 2020, 14 pages.
"Emulex HBA Manager", accessed on Apr. 28, 2023, 3 pages, <https://www.broadcom.com/products/storage/fibre-channel-host-bus-adapters/emulex-hba-manager>.
Disclosed Anonymously, "A Method and System for Real-time Discovery System", An IP.com Prior Art Database Technical Disclosure, IP.com No. IPCOM000240141D, IP.com Electronic Publication Date: Jan. 6, 2015, 4 pages.
Disclosed Anonymously, "Agnostic Edge Ecosystem for Sharing Device Capabilities", An IP.com Prior Art Database Technical Disclosure, IP.com No. IPCOM000265478D, IP.com Electronic Publication Date: Apr. 14, 2021, 7 pages.
Disclosed Anonymously, "Debugging system for micro-service cluster", An IP.com Prior Art Database Technical Disclosure, IP.com No. IPCOM000259148D, IP.com Electronic Publication Date: Jul. 16, 2019, 6 pages.
Disclosed Anonymously, "Prioritizing IO Requests within a group of VSCSI Adapters", An IP.com Prior Art Database Technical Disclosure, IP.com No. IPCOM000236970D, IP.com Electronic Publication Date: May 23, 2014, 3 pages.

*Primary Examiner* — Blake J Rubin
(74) *Attorney, Agent, or Firm* — Edward P. Li

(57) ABSTRACT

A computer-implemented method and a computer program product for pending updates status queries in extended link services. A host application on a host device queries an update pending on a target device. The host device constructs a pending update query command for the target device, where the pending update query command includes a descriptor tag, a descriptor length, and a pending update vector. The host device sends the pending update query command to the target device. The host device receives from the target device a response to the pending update query command, where the response includes a link service request information descriptor and a pending update descriptor.

20 Claims, 5 Drawing Sheets

PENDING UPDATES STATUS QUERIES IN THE EXTENDED LINK SERVICES

BACKGROUND

The present invention relates generally to a fabric infrastructure, and more particularly to pending updates status queries in extended link services (ELSs).

In a fabric infrastructure, there are many different types of devices that may require specific firmware or software updates. Occasionally, these updates require devices and/or adapters to go offline to be updated with the new firmware or software. Additionally, some new well-known features, such as Fibre Connection Dynamic Routing (FICON FIDR), require all endpoints to run a level of firmware that supports new well-known features before they can be enabled in a Storage Area Network (SAN) fabric infrastructure.

SUMMARY

In one aspect, a computer-implemented method for pending updates status queries in extended link services is provided. The computer-implemented method includes querying, by a host application on a host device, an update pending on a target device. The computer-implemented method further includes constructing, by the host device, a pending update query command for the target device, where the pending update query command includes a descriptor tag, a descriptor length, and a pending update vector. The computer-implemented method further includes sending to the target device, by the host device, the pending update query command. The computer-implemented method further includes receiving from the target device, by the host device, a response to the pending update query command, where the response includes a link service request information descriptor and a pending update descriptor.

In another aspect, a computer program product for pending updates status queries in extended link services is provided. The computer program product comprises a computer readable storage medium having program instructions embodied therewith, and the program instructions are executable by one or more processors. The program instructions are executable to: query, by a host application on a host device, an update pending on a target device; construct, by the host device, a pending update query command for the target device, where the pending update query command includes a descriptor tag, a descriptor length, and a pending update vector; send to the target device, by the host device, the pending update query command; and receive from the target device, by the host device, a response to the pending update query command, where the response includes a link service request information descriptor and a pending update descriptor.

In one aspect, a computer-implemented method for pending updates status queries in extended link services is provided. The computer-implemented method includes receiving, by a target device, a pending update query command from a host device, where the pending update query command includes a descriptor tag, a descriptor length, and a pending update vector. The computer-implemented method further includes constructing, by the target device, a response to the pending update query command, where the response includes a link service request information descriptor and a pending update descriptor. The computer-implemented method further includes sending to the host device, by the target device, the response to the pending update query command.

DETAILED DESCRIPTION

Embodiments of the present invention create a new extended link service (ELS). In the new ELS, a host device queries a port on a remote device to see whether there are any pending updates for the remote port/adapter/device, and a remote device generates a response based on the request of the host device.

Figure 1:
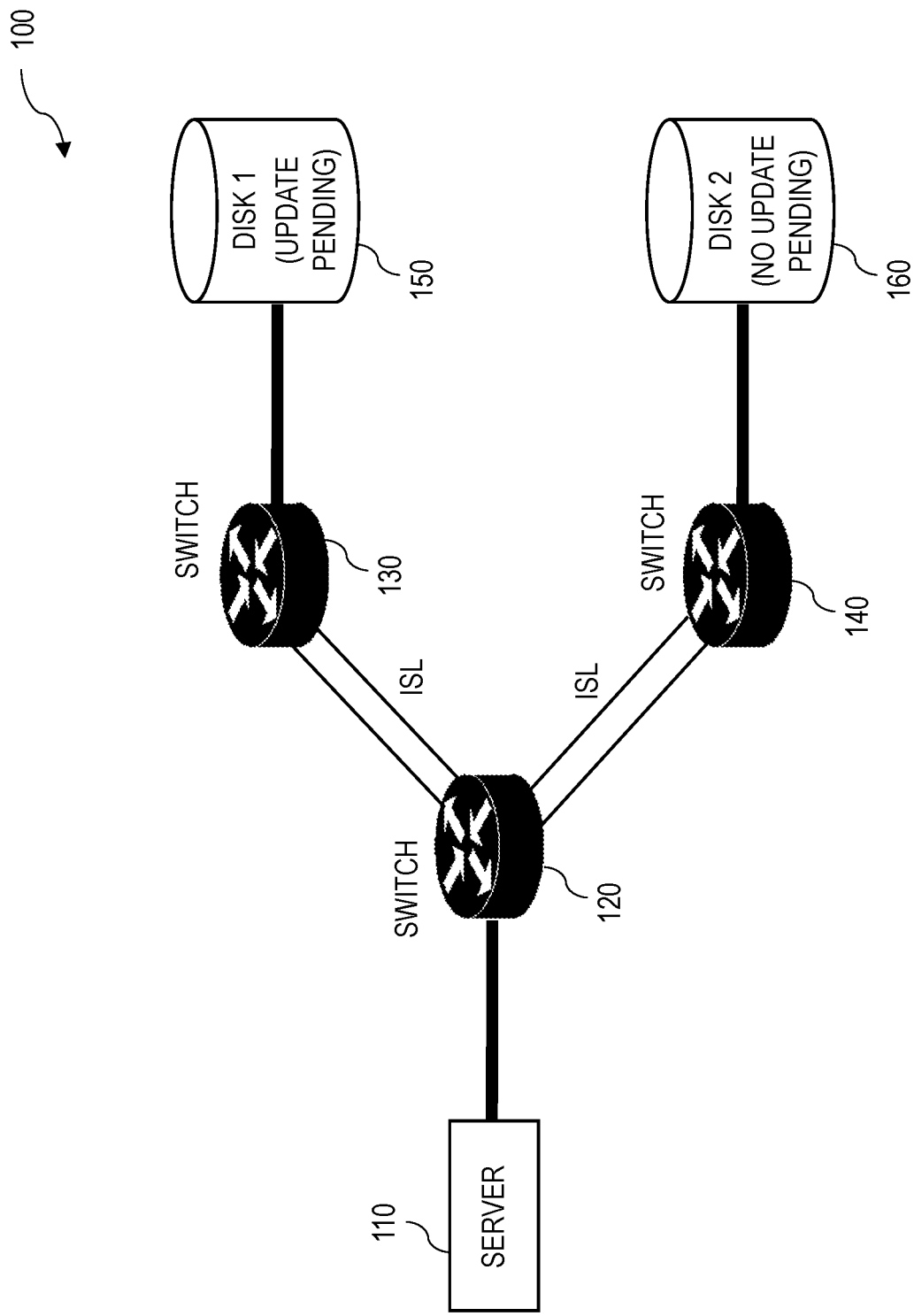
FIG. 1 illustrates a fabric infrastructure between two ports, in accordance with one embodiment of the present invention.

FIG. 1 illustrates fabric infrastructure 100 between two ports, in accordance with one embodiment of the present invention. FIG. 1 shows a cascaded switch configuration. Fabric infrastructure 100 includes server (or host device) 110, disk 1 (or target device) 150, and disk 2 (or target device) 160, where the server (or host device) and the two disks (or target devices) are physically attached to switches 120, 130, and 140. The switches are connected by inter-switch links (ISLs). In the example shown in FIG. 1, disk 1 (or target device) 150 has a firmware update pending, while disk 2 (or target device) 160 does not have a firmware update pending.

Figure 2:
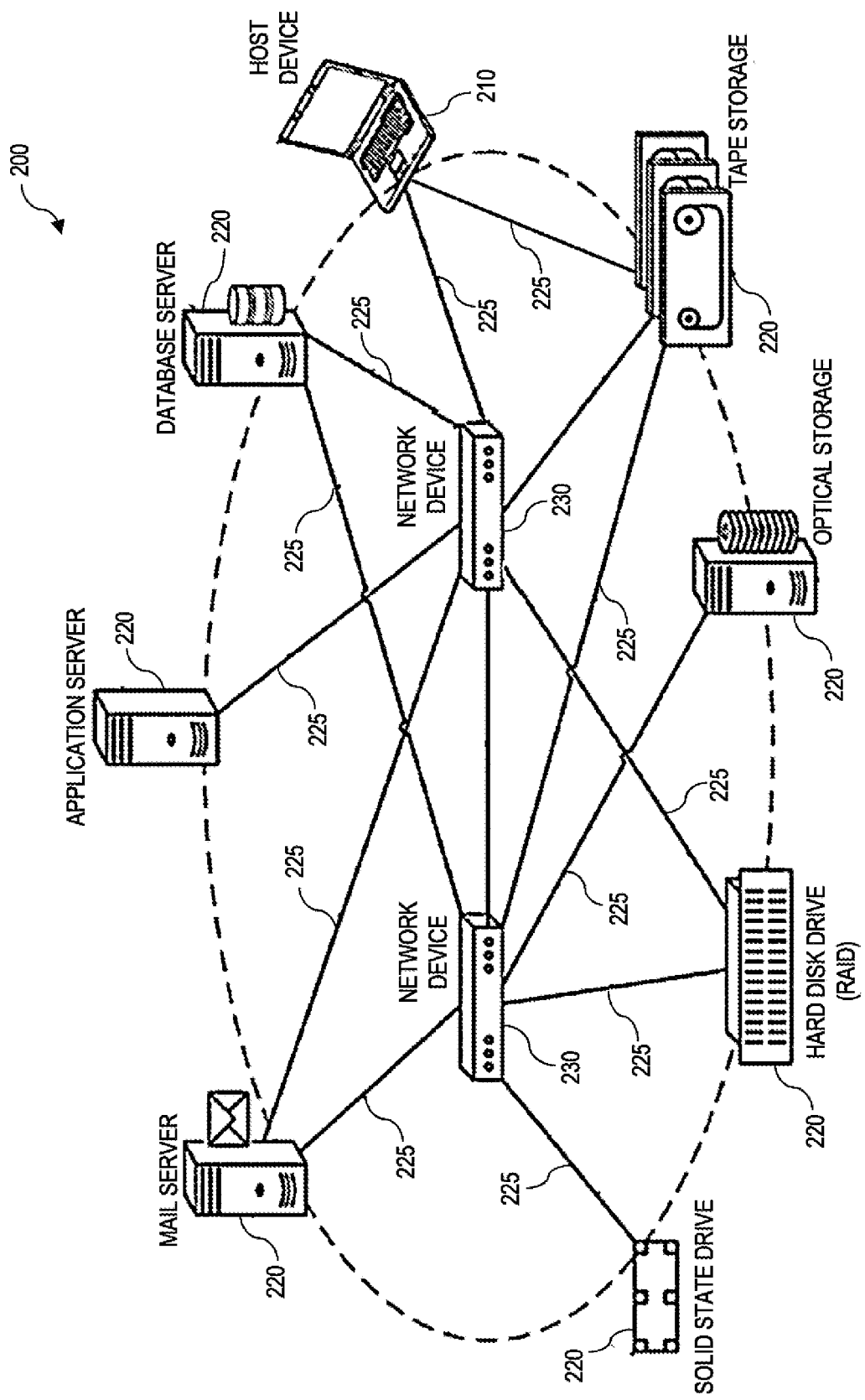
FIG. 2 is a schematic diagram of a storage area network (SAN), in accordance with one embodiment of the present invention.

FIG. 2 is a schematic diagram of storage area network (SAN) 200, in accordance with one embodiment of the present invention. SAN 200 includes a plurality of end devices 210, 220 that are each connected to one or more network devices 230, such as switches. Network devices 230 include memory circuitry and processing circuitry (e.g., including monitoring circuitry and limiting circuitry). The network topology of SAN 200 may be a switched fabric, where network devices 230 are switches. In some embodiments, one of network devices 230 may be set to switch mode or N-port ID virtualization (NPIV) mode. In some embodiments, at least one of end devices 210, 220 in the SAN is configured as a host device, such as host device 210 shown in FIG. 2. In some embodiments, the host device is embodied in a computer system, such as computer 501 shown in FIG. 5.

In some embodiments, each of network devices 230 includes a plurality of ports that connect network devices 230 to various end devices 210, 220 via links 225. In addition, each end device 210, 220 includes one or more ports that connect the end devices to one or more network devices 230 or to other end devices 220. In some embodiments, each link 225 is defined by the two ports that are connected to the link 225. The ports of end devices 220, 210 are referred to as channel ports while the ports of the network devices 230 are referred to as switch ports.

In some embodiments, network devices 230 support the Fibre Channel (FC) and/or Fibre channel over Ethernet (FCoE) Protocols. For example, a particular fixed port network device may support the FC protocol and/or the FCoE protocol. As another example, if a particular network device includes a plurality of line cards, at least some of which may support the FC protocol and/or at least some of which may support the FCoE protocol. It is noted that a particular port on a particular one of network devices 230 may support the FC protocol or the FCoE protocol by default or as configured (e.g., if the particular port is a universal port). Optionally, network devices 230 support one or more other protocols such as simple network management protocol (SNMP) for collecting information, e.g., for output on host device 210.

Figure 3:
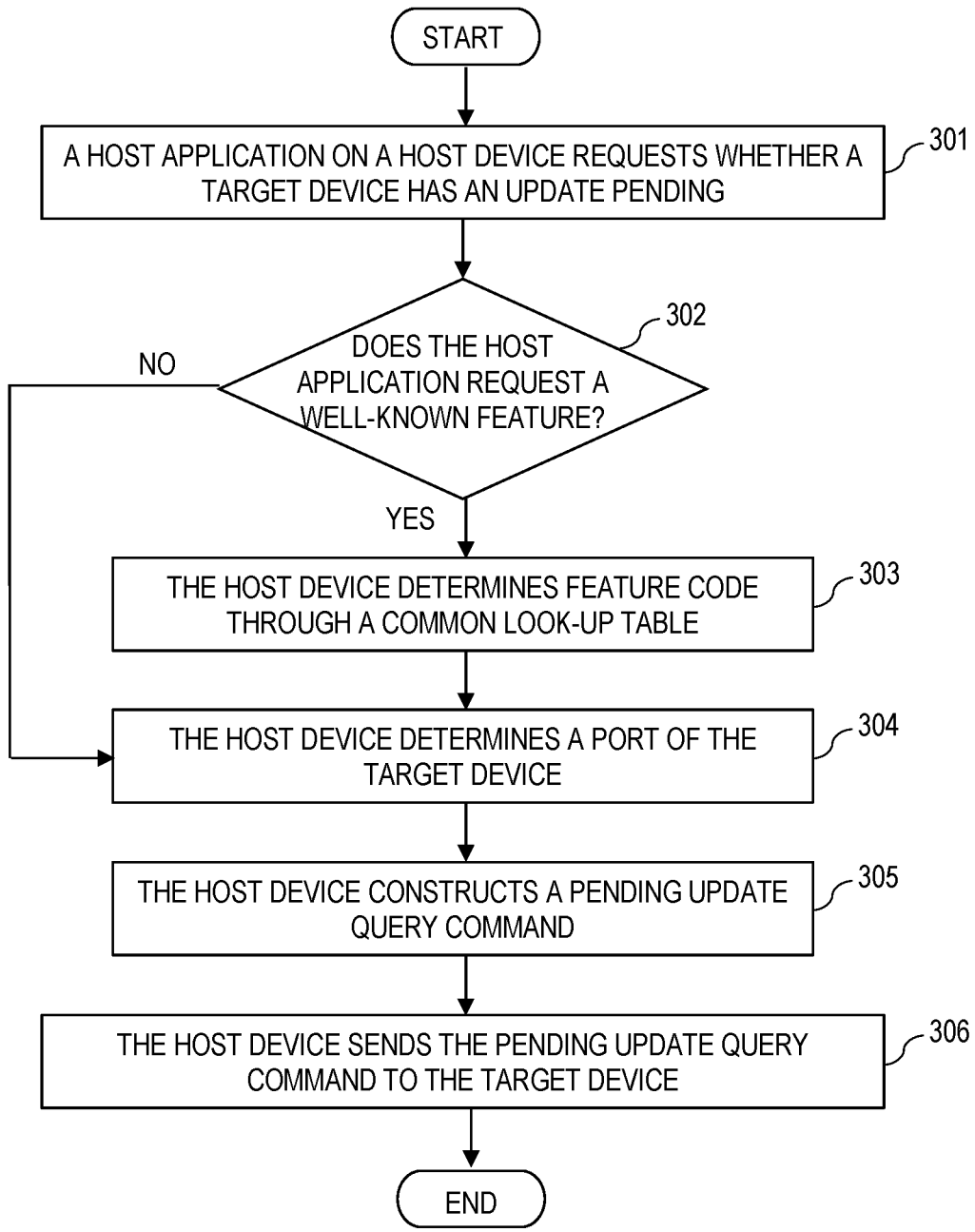
FIG. 3 is a flowchart showing operational steps of constructing a pending update query command by a host device, in accordance with one embodiment of the present invention.

FIG. 3 is a flowchart showing operational steps of constructing a pending update query command by a host device, in accordance with one embodiment of the present invention. In step 301, a host application on a host device requests whether a target device has an update pending. A request from the host application includes the Fibre Channel ID or link address of the port whose status is to be queried. The host application queries the update pending on the target device. Optionally, the host application also queries a well-known feature when querying the update pending. In step 302, the host application on host device determines whether the application requests a well-known feature.

In response to determining that the host application requests the well-known feature (YES branch of decision block 302), in step 303, the host device determines feature code through a common look-up table.

In response to determining that the application does not request the well-known feature (NO branch of decision block 302) or after step 303, in step 304, the host device determines a port of the target device with the World Wide ID (WWID) or World Wide Node Name (WWNN). In one embodiment, determining the port of the target device is by using a system configuration file (e.g., an I/O configuration data set (IOCDS) for IBM zSystems). In another embodiment, determining the port of the target device is by using any other location that contains port address information.

In step 305, the host device constructs a pending update query command for the target device. In response to determining that the well-known feature is included in an initial request from the host application, the host device adds a request for the well-known feature to pending update query command. For example, the structure of the pending update query command is presented in Table 1, and the pending update descriptor in Table 1 is presented in Table 2. The pending update query command includes a descriptor tag, a descriptor length, and a pending update vector.

In step 306, the host device sends the pending update query command to the target device. The pending update query command is sent to the target device through a local host bust adapter that has connectivity to the port of the target device.

TABLE 1

Structure of a pending update query command

| | Bits | | | |
|---|---|---|---|---|
| Word | 31-24 | 23-16 | 15-8 | 7-0 |
| 0 | New Command | 00 | 00 | 00 |
| 1 | Descriptor List Length = 12 | | | |
| 2 | MSB | | | |
| 3 | Pending Update Descriptor | | | |
| 4 | LSB | | | |

* MSB-Most Significant Bit or Byte
* LSB-Least Significant Bit or Byte

TABLE 2

Pending update descriptor in a pending update query command

| | Bits | | | |
|---|---|---|---|---|
| Word | 31-24 | 23-16 | 15-8 | 7-0 |
| 0 | Descriptor Tag = new value | | | |
| 1 | Descriptor Length = 4 | | | |
| 2 | Pending Update Vector | | | |

Figure 4:
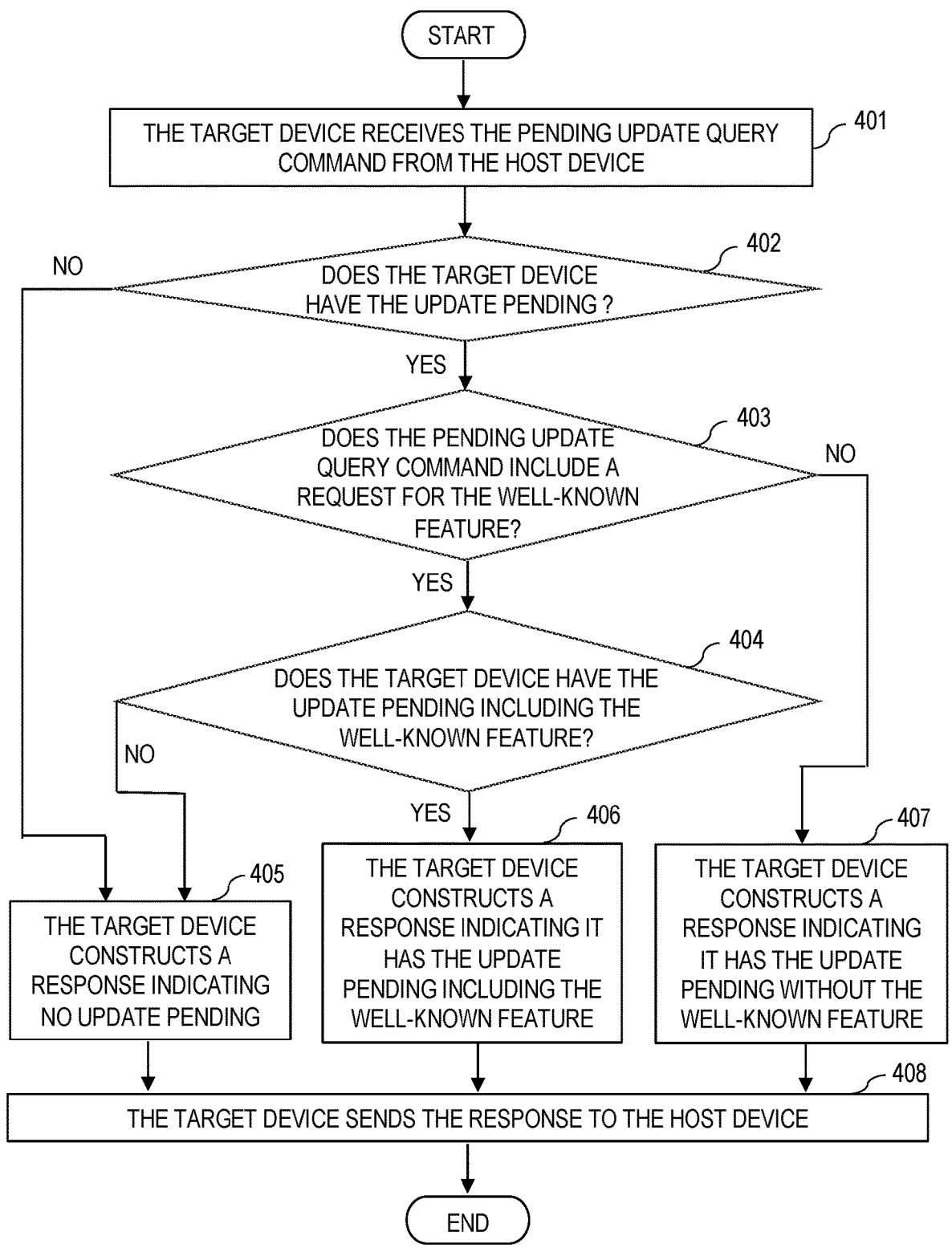
FIG. 4 is a flowchart showing operational steps of constructing a response to a pending update query command by a target device, in accordance with one embodiment of the present invention.

* Pending Update Vector:
8000 0000 h Update pending (general)
4000 0000 h Support for feature A
2000 0000 h Support for feature B FIG. 4 is a flowchart showing operational steps of constructing a response to a pending update query command by a target device, in accordance with one embodiment of the present invention. In step 401, the target device receives the pending update query command from the host device. The pending update query command is sent by the host device in step 306.

In step 402, the target device determines whether the target device has the update pending. In response to determining that target device has the update pending (YES branch of decision block 402), in step 403, the target device determines whether the pending update query command includes a request for the well-known feature.

In response to determining that the pending update query command includes the request for the well-known feature (YES branch of decision block 403), in step 404, the target device determines whether the target device has the update pending including the well-known feature.

In response to determining that target device does not have the update pending (NO branch of decision block 402) or in response to determining that the target device does not have the update pending including the well-known feature (NO branch of decision block 404), in step 405, the target device constructs a response indicating that the target device has no update.

In response to determining that the target device has the update pending including the well-known feature (YES branch of decision block 404), in step 406, the target device constructs a response indicating that the target device has the update pending including the well-known feature.

In response to determining that the pending update query command does not include the request for the well-known feature (NO branch of decision block 403), in step 407, the target device constructs a response indicating that the target device has the update pending without the well-known feature.

In step 405, step 406, or step 407, the target device constructs the response to the pending update query command. Table 3 shows an example of the structure of the response to the pending update query command. The response includes a link service request information descriptor and a pending update descriptor.

After constructing the response to the pending update query command in step 405, step 406, or step 407, in step 408, the target device sends the response to the host device.

TABLE 3

Structure of a response to a pending update query command

| Word | Bits | | | |
|------|-------|-------|------|-----|
|      | 31-24 | 23-16 | 15-8 | 7-0 |
| 0 | LS_ACC | 00 | 00 | 00 |
| 1 | Descriptor List Length = 24 | | | |
| 2 | MSB | | | |
| 3 | Link Service Request Information Descriptor | | | |
| 4 | LSB | | | |
| 5 | MSB | | | |
| 6 | Pending Update Descriptor | | | |
| 7 | LSB | | | |

\* Pending Update Descriptor contains a response masked with requested Pending Update Vector
\* LS_ACC-Link Services Accept
\* MSB-Most Significant Bit or Byte
\* LSB-Least Significant Bit or Byte Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment (CPP embodiment or CPP) is a term used in the present disclosure to describe any set of one, or more, storage media (also called mediums) collectively included in a set of one, or more, storage devices that collectively include machine readable code corresponding to instructions and/or data for performing computer operations specified in a given CPP claim. A storage device is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
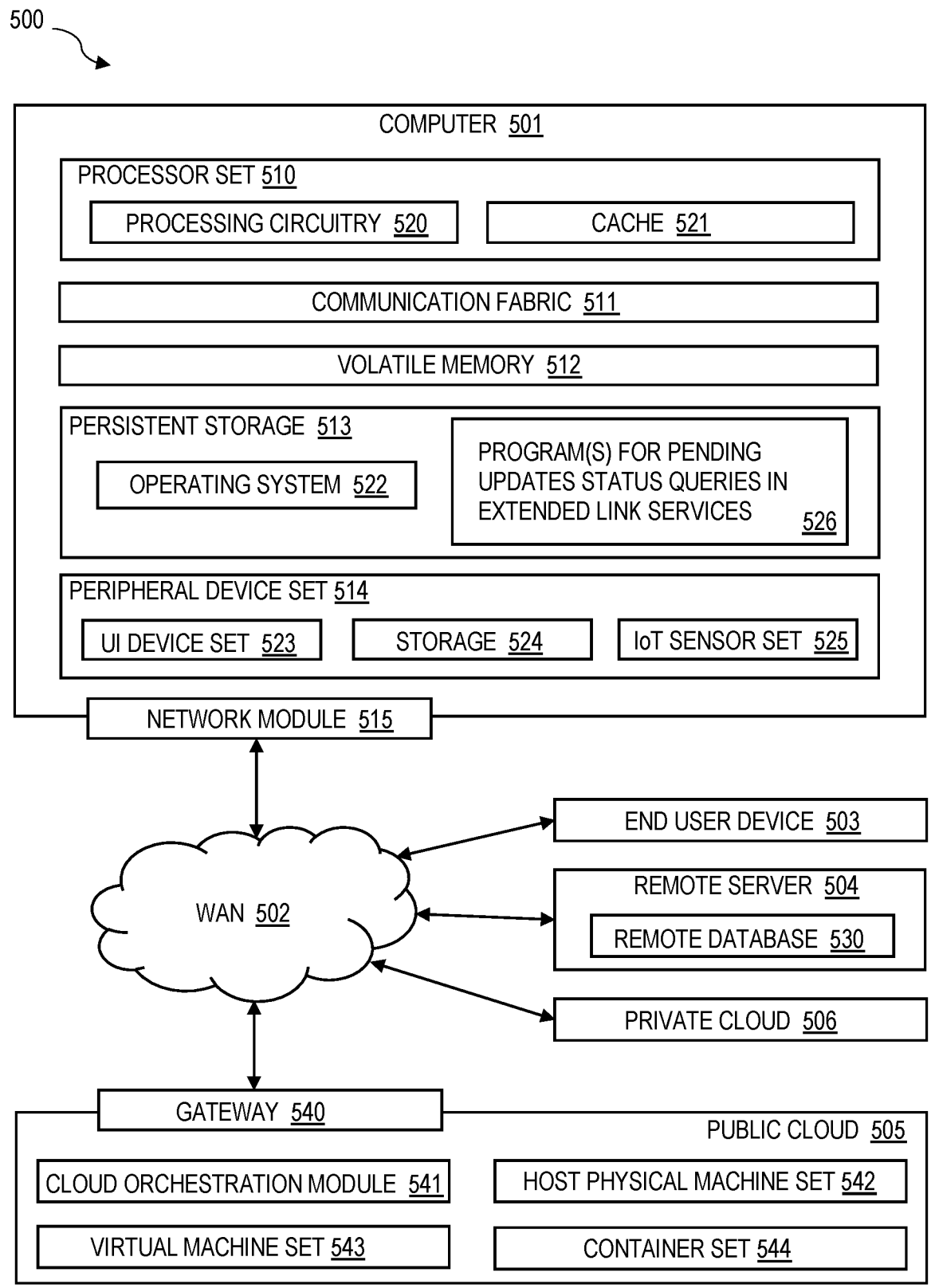
FIG. 5 is a systematic diagram illustrating an example of an environment for the execution of at least some of the computer code involved in performing pending updates status queries in extended link services (ELSs), in accordance with one embodiment of the present invention.

In FIG. 5, computing environment 500 contains an example of an environment some of the computer code involved in performing the inventive methods, such as program(s) 526 for pending updates status queries in extended link services. In addition to block 526, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 526, as identified above), peripheral device set 514 (including user interface (UI) device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

Computer 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

Processor set 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located off chip. In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 526 in persistent storage 513.

Communication fabric 511 is the signal conduction path that allows the various components of computer 501 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 512 is any type of volatile memory now known or to be developed in the future. Examples include dynamic type random access memory (RAM) or static type RAM. Typically, the volatile memory is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

Persistent storage 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface type operating systems that employ a kernel. The code included in block 526 typically includes at least some of the computer code involved in performing the inventive methods.

Peripheral device set 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

Network module 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

Remote server 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

Public cloud 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as images. A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

What is claimed is:

1. A computer-implemented method for pending updates status queries in extended link services, the method comprising:
    querying, by a host application on a host device, an update pending on a target device;
    constructing, by the host device, a pending update query command for the target device, wherein the pending update query command includes a descriptor tag, a descriptor length, and a pending update vector;
    sending to the target device, by the host device, the pending update query command; and
    receiving from the target device, by the host device, a response to the pending update query command, wherein the response includes a link service request information descriptor and a pending update descriptor.

2. The computer-implemented method of claim 1, further comprising:
    determining, by the host application, whether the host application requests a well-known feature;
    in response to determining that the host application requests the well-known feature, determining, by the host device, feature code through a common look-up table; and
    adding, by the host device, a request for the well-known feature to pending update query command.

3. The computer-implemented method of claim 1, further comprising:
    determining, by the host device, a port of the target device.

4. The computer-implemented method of claim 2, further comprising:
    receiving, by the target device, the pending update query command from the host device;
    determining, by the target device, whether the target device has the update pending; and
    in response to determining that the target device has the update pending, determining, by the target device, whether the pending update query command includes the request for the well-known feature.

5. The computer-implemented method of claim 4, further comprising:
    in response to determining that the pending update query command does not include the request for the well-known feature, constructing, by the target device, the response which indicates the target device has the update pending without the well-known feature.

6. The computer-implemented method of claim 4, further comprising:
    in response to determining that the pending update query command includes the request for the well-known feature, determining, by the target device, whether the target device has the update pending including the well-known feature; and
    in response to determining that the target device has the update pending including the well-known feature, constructing, by the target device, the response which indicates the target device has the update pending including the well-known feature.

7. The computer-implemented method of claim 4, further comprising:
    in response to determining that the target device does not have the update pending, constructing, by the target device, the response which indicates the target device has no update pending.

8. A computer program product for pending updates status queries in extended link services, the computer program product comprising a computer readable storage medium having program instructions stored therewith, the program instructions executable by one or more processors, the program instructions executable to:
    query, by a host application on a host device, an update pending on a target device;
    construct, by the host device, a pending update query command for the target device, wherein the pending update query command includes a descriptor tag, a descriptor length, and a pending update vector;

send to the target device, by the host device, the pending update query command; and receive from the target device, by the host device, a response to the pending update query command, wherein the response includes a link service request information descriptor and a pending update descriptor.

9. The computer program product of claim 8, further comprising the program instructions executable to:

determine, by the host application, whether the host application requests a well-known feature;

in response to determining that the host application requests the well-known feature, determine, by the host device, feature code through a common look-up table; and add, by the host device, a request for the well-known feature to pending update query command.

10. The computer program product of claim 8, further comprising the program instructions executable to:

determine, by the host device, a port of the target device.

11. The computer program product of claim 9, further comprising the program instructions executable to:

receive, by the target device, the pending update query command from the host device;

determine, by the target device, whether the target device has the update pending; and in response to determining that the target device has the update pending, determine, by the target device, whether the pending update query command includes the request for the well-known feature.

12. The computer program product of claim 11, further comprising the program instructions executable to:

in response to determining that the pending update query command does include the request for the well-known feature, construct, by the target device, the response which indicates the target device has the update pending without the well-known feature.

13. The computer program product of claim 11, further comprising the program instructions executable to:

in response to determining that the pending update query command includes the request for the well-known feature, determine, by the target device, whether the target device has the update pending including the well-known feature; and in response to determining that the target device has the update pending including the well-known feature, construct, by the target device, the response which indicates the target device has the update pending including the well-known feature.

14. The computer program product of claim 11, further comprising the program instructions executable to:

in response to determining that the target device does not have the update pending, construct, by the target device, the response which indicates the target device has no update pending.

15. A computer-implemented method for pending updates status queries in extended link services, the method comprising:

receiving, by a target device, a pending update query command from a host device, wherein the pending update query command includes a descriptor tag, a descriptor length, and a pending update vector;

constructing, by the target device, a response to the pending update query command, wherein the response includes a link service request information descriptor and a pending update descriptor; and sending to the host device, by the target device, the response to the pending update query command.

16. The computer-implemented method of claim 15, further comprising:

determining, by the target device, whether the target device has an update pending; and in response to determining that the target device has the update pending, determining, by the target device, whether the pending update query command includes a request for a well-known feature.

17. The computer-implemented method of claim 16, further comprising:

in response to determining that the pending update query command does not include the request for the well-known feature, constructing, by the target device, the response which indicates the target device has the update pending without the well-known feature.

18. The computer-implemented method of claim 16, further comprising:

in response to determining that the pending update query command includes the request for the well-known feature, determining, by the target device, whether the target device has the update pending including the well-known feature; and in response to determining that the target device has the update pending including the well-known feature, constructing, by the target device, the response which indicates the target device has the update pending including the well-known feature.

19. The computer-implemented method of claim 15, further comprising:

constructing, by the host device, the pending update query command for the target device; and sending to the target device, by the host device, the pending update query command.

20. The computer-implemented method of claim 16, further comprising:

determining, by a host application on the host device, whether a host application on the host device requests the well-known feature;

in response to determining that the host application requests the well-known feature, determining, by the host device, feature code through a common look-up table; and adding, by the host device, the request for the well-known feature to pending update query command.

* * * * *